July 5, 1966 H. J. ADESZKO 3,258,810
DEBRIS COLLECTOR
Filed Oct. 16, 1963
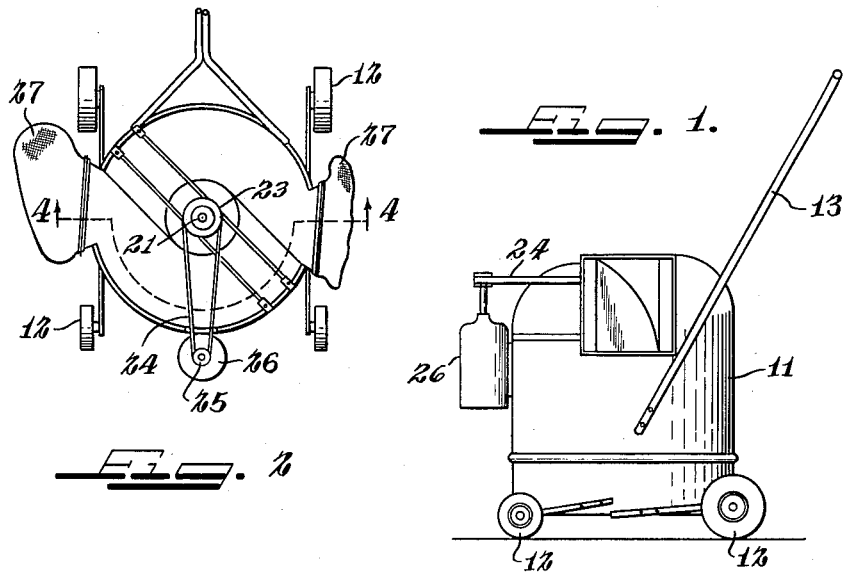
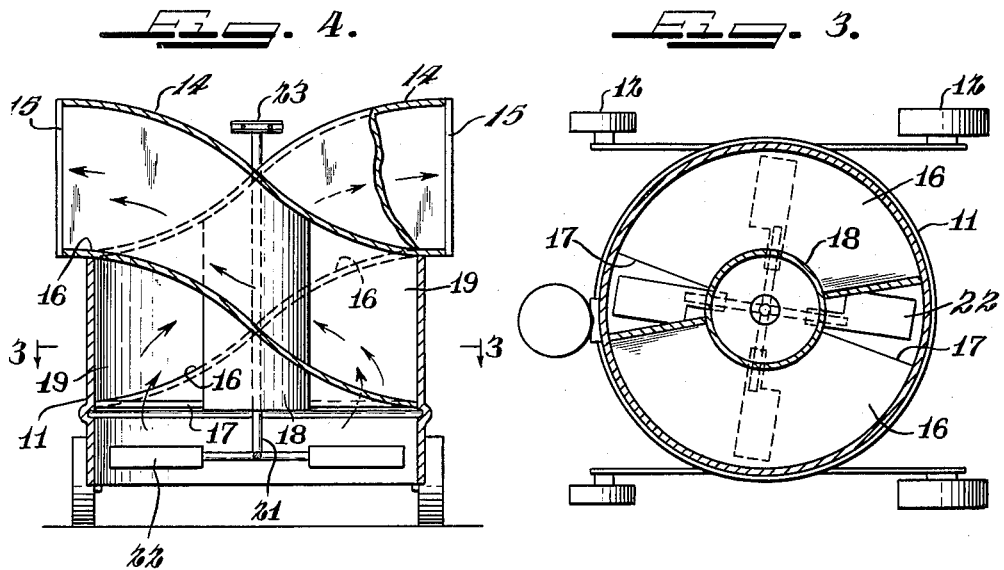
INVENTOR.
HENRY J. ADESZKO
BY
Charles H. Redman
Atty.

United States Patent Office 3,258,810
Patented July 5, 1966

3,258,810
DEBRIS COLLECTOR
Henry J. Adeszko, 13 Waynewood Drive,
West Chicago, Ill.
Filed Oct. 16, 1963, Ser. No. 316,710
2 Claims. (Cl. 15—412)

The present invention relates to improvements in debris collectors and is particularly concerned with the construction and assembly of apparatus for picking up debris and conveying it to a collector.

An object of the invention is to provide an apparatus of the character referred to which, operating by suction generated by a fan, functions to entrain debris and convey it through spirally arranged passageways or chutes for discharge into a collector, such as a bag.

Another object is to provide a structure for the purpose intended, which is not expensive to construct, is positive in its operation and very efficient in its use.

The structure by means of which the above noted and other objects and advantages of the invention are attained will be described in the following specification, taken in conjunction with the accompanying drawings, showing a preferred illustrative embodiment of the invention, in which:

FIG. 1 is a side elevational view of the apparatus, the collector bags being omitted;

FIG. 2 is a top plan view thereof, showing the bags in place;

FIG. 3 is a horizontal sectional view taken substantially on line 3—3 of FIG. 4; and FIG. 4 is a vertical sectional view taken substantially along line 4—4 of FIG. 2, the collector bags being omitted.

Referring to the exemplary disclosure of the apparatus shown in the accompanying drawings, the debris collector comprises a substantially cylindrical housing or shell 11 open at its bottom and which mounts a plurality of ground wheels 12 adapting the apparatus to be rolled along a ground surface with the open bottom elevated therefrom. A handle 13 is attached to the shell to facilitate its being moved.

The top of said housing or shell 11 is comprised of a pair of convolute upwardly inclined surfaces 14 which define the top walls of a pair of diametrically opposed openings 15. A bottom wall 16 leads from each opening and is inclined downwardly within the confines of the housing to terminate in an edge 17 disposed above the open bottom. A central cylindrical wall 18 arranged axially within the shell is integrally connected with the inclined bottom walls 16 so as to define, with said bottom walls and the wall of housing 11, a pair of spiral passageways 19, one in direct communication with each opening 15.

Mounted on suitable bearings axially of cylindrical wall 18 is a vertical shaft 21 which carries on its lower end a fan 22 disposed just below the inclined wall edges 17. The fan blades are arranged to draw air in through the bottom of the shell and force it upwardly through passageways 19. The upper extremity of said shaft mounts firmly a pulley 23 over which is trained an endless belt 24 that is also trained over a pulley 25 secured to the shaft of an electric motor 26.

In operation, as the apparatus is moved across a surface to be cleaned of debris, the motor is operated to rotate the fan, thus generating suction which picks up the debris and entrains it through the spiral passageways 19 for forcible discharge through openings 15. A collector, such as a bag 27, is removably secured over each opening for collecting the discharged debris.

Although I have described a preferred embodiment of my invention in considerable detail, it will be understood that the description thereof is intended to be illustrative, rather than restrictive, as many details of the structure disclosed may be modified or changed without departing from the spirit or scope of the invention. Accordingly, I do not desire to be restricted to the exact construction described.

What is claimed is:

1. Apparatus for picking up and collecting debris from a surface comprising a cylindrical housing open at its bottom, a pair of diametrically opposed radial openings in the upper portion of said housing, a pair of spiral passageways in said housing, one in communication with each opening, said passageways extending downwardly from said openings and terminating adjacent to but short of the housing bottom, a fan below said passageways having blades arranged to draw air in through the bottom of the housing and force it upwardly through said passageways, and drive means external of said housing and connected with the fan for rotating the fan.

2. Apparatus for picking up and collecting debris from a surface comprising a cylindrical housing open at its bottom, means supporting said housing above the surface, a pair of radial openings in the upper portion of said housing, a pair of convolute passageways in said housing, one in communication at its upper end with each opening, a vertical shaft journalled axially in said housing, a fan secured to the lower end of said shaft below the bottom ends of said passageways, said fan having blades arranged to draw air into the housing through its open bottom and force it upwardly through said passageways for discharge through the openings, the upper end of said shaft extending to the outside of the upper end of the housing, drive means on the upper end of said shaft, and a motor mounted on said housing having drive connection with said drive means.

References Cited by the Examiner
UNITED STATES PATENTS

| 1,410,913 | 3/1922 | Gray | 15—320 X |
|---|---|---|---|
| 1,498,255 | 6/1924 | Winchester | 15—385 X |
| 1,627,263 | 5/1927 | Baily | 15—320 |
| 1,672,001 | 6/1928 | Serva et al. | 15—347 X |
| 1,718,804 | 6/1929 | White | 15—385 |
| 2,513,466 | 7/1950 | Fleming | 15—340 X |
| 2,994,471 | 8/1961 | Lewis et al. | 230—47 X |

WALTER A. SCHEEL, Primary Examiner.